US010425956B2

(12) United States Patent
Callard et al.

(10) Patent No.: US 10,425,956 B2
(45) Date of Patent: Sep. 24, 2019

(54) LINK SCHEDULING SYSTEM AND METHOD

(71) Applicants: Aaron Callard, Ottawa (CA); Alex Stephenne, Stittsville (CA); Sophie Vrzic, Kanata (CA); Philippe Leroux, Ottawa (CA)

(72) Inventors: Aaron Callard, Ottawa (CA); Alex Stephenne, Stittsville (CA); Sophie Vrzic, Kanata (CA); Philippe Leroux, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 155 days.

(21) Appl. No.: 14/828,872

(22) Filed: Aug. 18, 2015

(65) Prior Publication Data

US 2017/0055276 A1    Feb. 23, 2017

(51) Int. Cl.
*H04W 72/12* (2009.01)

(52) U.S. Cl.
CPC .................. *H04W 72/12* (2013.01)

(58) Field of Classification Search
CPC .............................................. H04W 72/1205
See application file for complete search history.

(56) References Cited

U.S. PATENT DOCUMENTS

| 2002/0143926 | A1* | 10/2002 | Maltz | H04L 41/0213 709/224 |
| 2007/0280175 | A1* | 12/2007 | Cheng | H04B 7/022 370/338 |
| 2008/0291831 | A1 | 11/2008 | Alpert et al. | |
| 2010/0061235 | A1* | 3/2010 | Pai | H04L 12/2801 370/230.1 |
| 2010/0220601 | A1* | 9/2010 | Vermani | H04L 1/0025 370/248 |
| 2011/0170411 | A1 | 7/2011 | Wang et al. | |
| 2012/0155366 | A1* | 6/2012 | Zirwas | H04B 7/024 370/312 |

(Continued)

FOREIGN PATENT DOCUMENTS

WO    2010011796 A2    1/2010

OTHER PUBLICATIONS

International Search Report for International Patent Application No. PCT/CN2016/091920 dated Oct. 26, 2016.

(Continued)

*Primary Examiner* — Alex Skripnikov
*Assistant Examiner* — Sharmin Chowdhury

(57) ABSTRACT

A hierarchical link scheduling system and method is provided. A central controller gathers network information, including global parameters and long term demands, and determines an initial schedule for link activation based on these variables. A scheduler receives the initial schedule and modifies the initial schedule based on local parameters, inter-schedule negotiation, or other short term or localized requests. The scheduler activates the links according to the modified schedule. Accordingly, the scheduler can be responsible for modifying the initial schedule provided by central controller with localized or short term requests or demands, and providing the necessary parameters to enable link activation between nodes according to the modified schedule.

9 Claims, 11 Drawing Sheets

(56) References Cited

U.S. PATENT DOCUMENTS

| | | | | |
|---|---|---|---|---|
| 2013/0286974 | A1 | 10/2013 | Zhou et al. | |
| 2014/0092765 | A1* | 4/2014 | Agarwal | H04W 24/02 370/252 |
| 2015/0319658 | A1* | 11/2015 | Padden | H04W 16/14 455/436 |
| 2015/0373554 | A1* | 12/2015 | Freda | H04W 16/14 455/450 |
| 2016/0249353 | A1* | 8/2016 | Nakata | H04W 28/16 |

OTHER PUBLICATIONS

ETSI GS NFV-SWA 001 V1.1.1 (Dec. 2014), Network Functions Virtualisation (NFV); Virtual Network Functions Architecture, Dec. 2014.

Eklund et al., IEEE Standard 802.16: A Technical Overview of the WirelessMAN™ Air Interface for Broadband Wireless Access, IEEE Communications Magazine, pp. 98-107, Jun. 2002.

Wu et al., Receiver-initiated busy-tone multiple access in packet radio networks, SIGCOMM '87 Proceedings of the ACM workshop on Frontiers in computer communications technology, pp. 336-342, Stowe, Vermont, USA—Aug. 11-13, 1987.

* cited by examiner

800

| LINK | SLOT 1 | SLOT 2 | SLOT 3 | SLOT 4 |
|---|---|---|---|---|
| 320a→320c | //// | | | |
| 320a→320d | //// | | | |
| 320a→320e | | //// | | |
| 320b→320c | //// | | | |
| 320b→320d | //// | | | |
| 320b→320e | | //// | | |
| 320c→320a | | | //// | |
| 320d→320a | | | //// | |
| 320e→320a | | | | //// |
| 320c→320b | | | //// | |
| 320d→320b | | | //// | |
| 320e→320b | | | | //// |

| LINK | SLOT 1 | SLOT 2 | SLOT 3 | SLOT 4 |
|---|---|---|---|---|
| 320a→320c | | | ▨ | |
| 320a→320d | | | ▨ | |
| 320a→320e | | | | ▨ |
| 320c→320a | ▨ | | | |
| 320d→320a | ▨ | | | |
| 320e→320a | | ▨ | | |

| LINK | SLOT 1 | SLOT 2 | SLOT 3 | SLOT 4 |
|---|---|---|---|---|
| 320b→320c | | | ▨ | |
| 320b→320d | | | ▨ | |
| 320b→320e | | | | ▨ |
| 320c→320b | ▨ | | | |
| 320d→320b | ▨ | | | |
| 320e→320b | | ▨ | | |

FIG. 8c

| LINK | SLOT 1 | SLOT 2 | SLOT 3 | SLOT 4 |
|---|---|---|---|---|
| 320a→320c | ▨ | | | |
| 320a→320d | ▨ | | | |
| 320a→320e | | ▨ | | |
| 320b→320c | ▨ | | | |
| 320b→320d | ▨ | | | |
| 320b→320e | | ▨ | | |
| 320c→320a | | | ▨ | |
| 320d→320a | | | ▨ | |
| 320e→320a | | | | ▨ |
| 320c→320b | | | ▨ | |
| 320d→320b | | | ▨ | |
| 320e→320b | | | | |

832

LINK SCHEDULING SYSTEM AND METHOD

FIELD OF THE INVENTION

The present invention is related to network communications, and in particular towards a link scheduling system for wireless communication and associated methods.

BACKGROUND

Link scheduling is commonly performed on communication networks in order to share limited connectivity resources amongst a number of competing nodes. A link comprises a channel, path, or interface used to communicatively couple a pair of nodes for data transfer. Links are activated according to a schedule which assigns a predetermined time slot, channel, and other parameters for transferring and receiving data. Various approaches for link scheduling may be employed.

Link scheduling is an important task in wireless communication networks because of the limited connectivity resources that must be shared amongst the system elements. Conventionally, a central entity determines a link activation schedule based on a number of network parameters and requests. However, with increasing network sizes and demands, quickly and efficiently scheduling links becomes increasingly difficult.

Moreover, for increasing network sizes, the complexity of multi-hop routing configurations increases, resulting in the scheduling of links becoming an increasingly complex task. The changing of network characteristics and demands on the network can further complicate link scheduling. This problem can be further exacerbated when trying to resolve urgent short term requests and underlying interference issues while simultaneously scheduling multiple links.

Therefore there is a need for a system and method for link scheduling that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide a link scheduling system and method. In accordance with embodiments of the present invention, there is provided a method for managing one or more links in a communication network. The method includes receiving an initial schedule or information indicative of the initial schedule. The initial schedule is determined based on at least a global parameter and initial schedule defines initial management of the one or more links. The method further includes receiving a set of constraints related to the one or more links. The method further includes modifying the initial schedule based on a local parameter and the set of constraints, thereby generating a modified schedule. The method further includes transmitting instructions to activate the one or more links according to the modified schedule. The modified schedule defines modified management of the one or more links and each link permits data transmission from a first node to a second node.

In accordance with embodiments of the present invention there is provided a method for managing links in a communication network. The method includes receiving an initial schedule or information indicative of the initial schedule at a first scheduler, such that the initial schedule includes parameters for defining initial management of the links. The method further includes modifying the initial schedule based on interactive negotiation with a second scheduler to generate a modified schedule and transmitting instructions to activate the links according to the modified schedule. The modified schedule defines modified management of the links and each link permits data transmission between a first node and a second node.

In accordance with embodiments of the present invention, there is provided a method for managing one or more links in a communication network. The method includes determining an initial schedule or information indicative of the initial schedule. The initial schedule is determined based on at least a global parameter and the initial schedule defines initial management of one or more links. The method thither includes determining a set of constraints related to the one or more links, the set of constraints indicative of restrictions, limitations or both which relate to modification of the initial schedule. The method further includes transmitting the initial schedule or information indicative of the initial schedule and transmitting the set of constraints.

In accordance with embodiments of the present invention, there is provided a system for managing one or more links in a communication network. The system includes a central controller configured to determine an initial schedule according to at least a global parameter, the initial schedule defining initial management of one or more links, the central controller further configured to determine a set of constraints. The system further includes a scheduler configured to receive information indicative of the initial schedule and the set of constraints from the central controller. The scheduler is configured to modify the initial schedule based on a local parameter and the set of constraints, thereby generating a modified schedule which defines modified management of the one or more links. The scheduler is further configured to transmit instructions to activate the one or more links according to the modified schedule.

In accordance with embodiments of the present invention, there is provided a system for managing links in a communication network. The system includes a central controller configured to determine an initial schedule according to at least a global parameter. The initial schedule defining initial management of the links and each link permitting data transmission between a pair of nodes when activated. The system further includes a first scheduler configured to control a first subset of the links. The first controller further is further configured to receive information indicative of an initial schedule from the central controller, which defines initial management of the links. The system further includes a second scheduler configured to control a second subset of the links. The first scheduler is configured to modify the initial schedule based on interactive negotiation with the second scheduler, thereby generating a modified schedule defining modified management of the links. The first scheduler is further configured to transmit instructions to activate the first subset of links according to the modified schedule and the second scheduler is configured to transmit instructions to activate the second subset of links according to the modified schedule.

BRIEF DESCRIPTION OF THE FIGURES

Further features and advantages of the present invention will become apparent from the following detailed description, taken in combination with the appended drawings, in which:

FIG. 8A illustrates an initial schedule which schedulers receive from a central controller according to embodiments of the present invention.

FIG. 8B illustrates a set of constraints for a first scheduler according to embodiments of the present invention.

FIG. 8C illustrates a set of constraints for a second scheduler according to embodiments of the present invention.

It will be noted that throughout the appended drawings, like features are identified by like reference numerals.

DETAILED DESCRIPTION

The term "global parameter" is used to define a parameter that is indicative of longer term demands on a communication network. A global parameter can be indicative of global aspects of the communication network including traffic load, traffic splitting, channel conditions, Quality of Service, network capacity, fairness constraints, grouping of links or other aspect or combination of aspects of a wireless network, which is reflective of a longer term demand and/or a global network demand. In some embodiments, a global parameter can be indicative of a central controller's understanding of the current operational state of one or more nodes in the communication network, or a particular node's characteristics.

The term "local parameter" is used to define a parameter that is indicative of a relatively short term demand on a communication network. A local parameter can be indicative of localized aspects of the communication network including, for example, aspects relating to priority demand, timing, buffer status information or other aspect or combination of aspects of a wireless network, which is reflective of a short term demand and/or a localized network demand. In some embodiments, a local parameter can be indicative of channel information or node state, for example whether a node is in sleep mode or Transmission (Tx) mode. In some embodiments, a local parameter is indicative of information that the particular node, such as a scheduler, has regarding other nodes within the communication network.

Embodiments of the invention are directed towards a semi-centralized link scheduling system and method. The decisions for the scheduling of links can be determined based on centralized, longer term, global parameters in addition to accounting for short term and localized parameters and/or demands. For example, scheduling based on centralized, longer term, global parameters can be performed by a central controller, while modification of this schedule based on short term and localized demands can be performed by a scheduler. This separation of the scheduling of link activation can reduce the processing strain typically placed on a centralized scheduling entity, to more efficiently permit scheduling of short term and localized demands. This separation of the scheduling of link activation can also improve the resiliency to non-optimalities of a central controller's knowledge of operating parameters, allowing for better overall performance. For example, embodiments of the link scheduling system and method may achieve performance comparable to that of a central entity having full scheduling control, while having improved versatility in adapting to various localized system changes, for example urgent or unexpected link scheduling requests. This may beneficially result in reduced system traffic load and potentially reduced delays due to processing communication.

Figure 1:
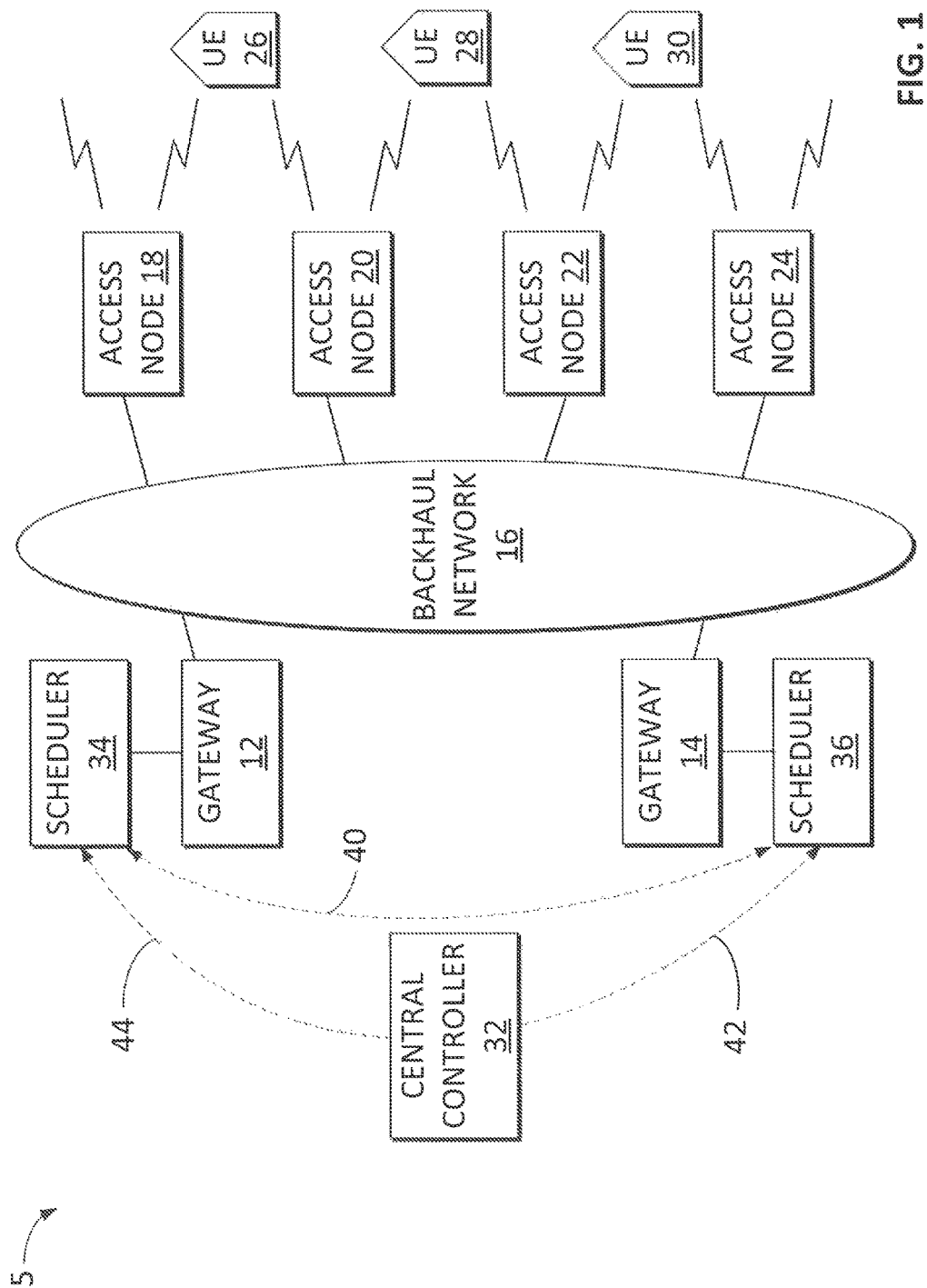
FIG. 1 illustrates an example wireless communication network to which embodiments of the present invention may be applied.

Referring to FIG. 1, there is shown a wireless communication network 5 to which embodiments of the present invention may be applied. The network includes a plurality of access nodes 18, 20, 22 and 24, which are connected to gateways 12, 14 via network 16, which may be for example a backhaul network. Upon connection of user equipment (UE) 26, 28, 30 to an access node 18, 20, 22, 24, via a communication medium, e.g. wireless, the UE can communicate with other nodes or gateways linked by the communication network. As would be readily understood, the backhaul network 16 can provide a multi-hop connection or link between an access node and a gateway.

According to embodiments, scheduler 34 is associated with gateway 12 and is configured to control links to and from gateway 12. Scheduler 36 is associated with gateway 14 and is configured to control links to and from gateway 14. Schedulers 34 and 36 communicate via communication link 40 to permit inter-scheduler communication and negotiation. Central controller 32 is configured to communicate with schedulers 34, 36 and also configured to receive network status information and demands from the communication network. The central controller 32 is further configured to generate an initial schedule and in some instances a set of constraints for provision to schedulers 34, 36, as will be discussed later.

Figure 2:
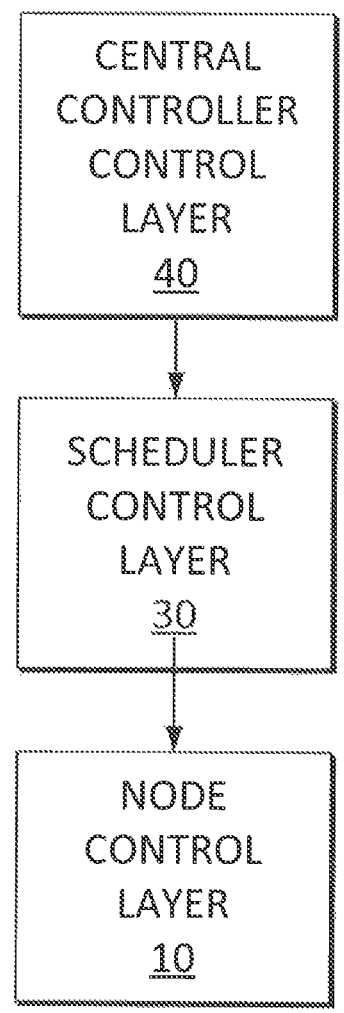
FIG. 2 illustrates a media access control (MAC) diagram representing the functional control layers of each of the central controller, schedulers and plurality of nodes according to embodiments of the present invention.

According to embodiments of the present invention and referring to FIG. 2, there is shown a media access control (MAC) control layer diagram representing the functional control layers of each of the central controller control layer 40, scheduler control layer 30 and node control layers 10. As is understood according to MAC data communication protocol, each control layer provides the necessary control mechanisms and parameters to the sublayer directly underneath, in order to provide collaborative, control of communication between network nodes in a multiple access network through a shared communication medium. By way of example, and with reference to FIG. 1, central controller 32 gathers network information, including global parameters and long term demands, and determines an initial schedule based on these variables. According to embodiments, the initial schedule can include information relating to desired link activation at desired times. In some embodiments, the central controller further determines a set of constraints which include restrictions or limitations regarding modifications or changes that can be made to the initial schedule. Schedulers 34, 36 receive the initial schedule or related information and optionally the set of constraints from central controller 32. Schedulers 34, 36 subsequently modify the initial schedule based on local parameters, inter-schedule negotiation, or other short term or localized requests. For example, scheduler 34 may receive an urgent uplink request from access node 18 to gateway 12 or 14. Scheduler 34 may then review the initial schedule to determine immediate buffer availability, and modify the initial schedule to schedule the requested link for use by access node 18. Alternatively, scheduler 34 may participate in an interactive negotiation with scheduler 36, considering additional requests associated with gateway 14 to modify the initial schedule such that a link for use by access 18 can be provided. Scheduler 34 then activates one or more links according to the modified schedule, by providing necessary parameters such as timing, control, modulation coding scheme (MCS) and power masking parameters to control the activation of each link. Accordingly, schedulers 34, 36 are responsible for modifying the initial schedule provided by central controller 32 in response to localized or short term requests or demands, and providing the necessary parameters to enable link activation between nodes according to the modified schedule. By allocating the modification of the initial schedule based on shaft term and localized requests to schedulers 34, 36, system efficiency may be increased without overburdening the resources of central controller 32.

The central controller is configured to determine an initial schedule for the activation of a plurality of links associated with a communication network. An activated link provides a connection between nodes for data transfer therebetween. According to embodiments, the central controller performs actions including one or more of collecting, receiving and determining information regarding communication network activity, operational characteristics and/or other parameters that may affect the operation of the communication network. The central controller subsequently determines an initial schedule for link activation based on one or more global parameters. Each global parameter can be reflective of a longer term or global demand, request or requirement, in this manner, according to embodiments, the central controller can provide an initial schedule for link activation that considers and may satisfy a plurality of demands and requirements which are represented in a global context, rather than ones that are more localized in nature. The central controller can be further configured to instantiate, select and/or assign one or more schedulers to control the activation and operation of a certain set of links.

In some embodiments, the central controller is further configured to generate or create a set of constraints which represent one or more scheduler limitations or restrictions. The set of constraints is configured to mitigate undesired operation or activation of one or more links between the nodes. The set of constraints provides a basis for limiting the modification of certain aspects of the initial schedule. According to embodiments, a restriction indicates a modification that should not be made to the initial schedule. For example, a restriction may inhibit the simultaneous activation of two links which connect a single node to two different access nodes. According to embodiments, a limitation indicates a limit associated with respect to modifications that can be made to the initial schedule. For example, a limitation may define the extent to which a particular aspect of a link can be modified, thereby limiting the type of modifications that can be made by the scheduler.

According to embodiments, the central controller can determine potential communication paths, reachability constraints and probabilities that can be associated with the activation of a plurality of links in a global context for the communication network.

The initial schedule or information indicative of the initial schedule can be transmitted to the appropriate scheduler by the central controller. In some embodiments, the set of constraints is also transmitted to the scheduler by the central controller.

A scheduler is configured to receive the initial schedule or information indicative of the initial schedule from the central controller and modify the initial schedule based on local parameters, inter-schedule negotiation or other short term or localized requests. In some embodiments, the scheduler further receives a set of constraints which are to be respected by the scheduler during the modification of the initial schedule.

According to some embodiments, the scheduler receives the initial schedule from the central controller. However, in some embodiments the scheduler receives information indicative of the initial schedule. For example, the central controller can generate a plurality of signalling parameters that convey information indicative of the initial schedule. The signalling parameters can be received by the scheduler and used to determine the initial schedule and the assignment of links for activation which are associated with the initial schedule.

The information indicative of the initial schedule can vary considerably from one embodiment to another. In some embodiments, the complete initial schedule is received by the scheduler and the complete initial schedule can include substantially all information normally contained in a grant for network access, as well as other higher layer parameters, for example packetization, Radio Link Control (RLC) protocol, and the like. In some embodiments, only a subset of the information indicative of the initial schedule is received by the scheduler. The subset of information can be information relating to one or more of precoding, resource assignment, power levels or the like. In some embodiments, the information indicative of the initial schedule can be expressed as secondary parameters such as the target received signal power, or Signal to Noise Ratio (SNR) for which primary scheduling information can be derived, for example, transmit power=target received power divided by path loss. In some embodiments, the information indicative of the initial schedule is representative of received signal values. For example the received signal can be y which is equal to $H*P*x$. In this example, H is the presumed channel matrix, P is the precoding matrix and x is the data symbol to be transmitted. As new values of the presumed channel matrix are determined during operation, the values of P can be updated in order to mitigate the influence of distortion and noise which is represented by H.

In some embodiments, information indicative of the initial schedule can relate to metrics used to calculate the impact of interference. For example, the scheduler can receive a function, or parameters of a function, which relate one or more of the amount of interference received at a particular node, power transmitted by a particular node and loss of performance based on interference. For example, for a given Modulation and Coding Scheme (MCS) a constant metric is indicative that the interference has zero impact when the interference is below a certain. Also for a given MCS, a decreasing metric can be indicative of an increasing impact of interference. This information can relate to a global utility which the scheduler is attempting to maximize. It is understood that other mappings which relate to the impact of interference can be used.

In some embodiments of the present invention, the information indicative of the initial schedule can be limited. For instance the information can define a bit rate for data transmissions to a particular user or pseudo user that the central controller assumes to exist. A pseudo user can represent an abstraction of many users, or represent classes of users or types of users. In some embodiments, the information indicative of the initial schedule relates to resource hierarchy, which can relate to the priority of use of resources.

In some embodiments, signalling parameters can be provided to influence the scheduler to follow the decision of the central controller, unless there is information that is known to the scheduler that would result in the scheduler not being able to follow the initial schedule. These signalling parameters may be in the form of penalties if certain configurations are not met or in the form of positive weights when certain configurations are met. These penalties or positive weights may be used by the scheduler for optimization of modification of the initial schedule based on local parameters in addition to accounting for the "value" of following the initial schedule. For example, solutions which result in minor modification of initial schedule can be valued more favourably than other solutions. This form of signalling parameters which includes penalties or positive weights can result in an iterative process being applied to the schedule modification process in order to determine the optimal or most valued modified schedule. In some embodiments, these weights can be associated with a plurality of different parameters, for example transmit power allocations and beam patterns. In some embodiments, these weights may also be associated with receiver beam usages, for example, these weights can be used for nodes which have a hybrid antenna system.

In some embodiments, the scheduler can perform scheduling optimization by computing a solution to a constrained optimization problem. The constrained optimization problem may specify a utility function to be maximized along with a set of constraints to be respected by the solution, as would be readily understood by a worker skilled in the art. In some embodiments, the above-mentioned penalties imposed for not meeting certain considerations can be incorporated into the utility function as terms which tend to decrease the utility function when the certain considerations are unmet. This provides a motivation for meeting the certain considerations while allowing the possibility that they can be unmet. In some embodiments, the penalties can be incorporated into the set of constraints, as constraints which are violated when the certain considerations are unmet. This provides a stricter requirement for meeting the certain considerations.

According to some embodiments, the scheduler further receives a set of constraints, which are considered by the scheduler during the modification of the initial schedule. According to embodiments, the set of constraints can define parameters relating to link activation, link capacity or other limitations or restrictions on assignment of a link. For example, a restriction may identify two links that cannot be simultaneously activated.

In some embodiments, a set of constraints can define power allocations, capacity of links or other parameters that provide a scheduler with information indicative of one or more limitations or restrictions on modification of the initial schedule.

In some embodiments, the set of constraints received by the scheduler allow for minor variations in scheduling decisions, relative to the initial schedule. In some embodiments, the set of constraints relate to multiple aspects of transmission and a limited number of parameters relating to the scheduling of links are flexible. In some embodiments, the set of constraints provides for MCS modification only, as a scheduler may have more up to date information regarding channel operational parameters, as well as actions taken by other nodes. In this case, the scheduler would use the initial schedule and potentially modify the MCS for the links, only if necessary. It would be understood that these types of modification limitations or restrictions may be applicable in both uplink and downlink transmissions. In some embodiments, the scheduler is provided with a set of constraints which solely allow for the modification of the hybrid automatic repeat request (HARQ) process. Limiting the potential modification of the initial schedule to adjustment of the HARQ process by the scheduler may be desired as a central controller may not be aware of the success or failure of HARQ processes. Thus a scheduler can choose to transmit incremental redundancy symbols, or new data (or a mixture of the two) based on local data. In some embodiments, the set of constraints allows the scheduler to modify packet prioritization, because more up to date information relating to packet prioritization may be available to the scheduler.

In some embodiments, the set of constraints can include a restriction that defines an action that the scheduler is not permitted to perform. This type of restriction can prevent the successful activation of a link which the central controller has assigned.

In some embodiments, the central controller can provide impact parameters associated with one or more links and an impact limit. The scheduler can use these impact parameters to evaluate the impact that modification of the initial schedule can have on network performance. The impact of modification can then be compared to the impact limit that has been provided by the central controller. For example, a limitation may assign an impact limit of less than X dBm of interference, resulting from a schedule modification, wherein X is a specified value.

Further examples of restrictions or limitations that can be included in the set of constraints can include: Link X cannot be active on a predetermined set of time/frequency resources; Link X must have a transmit (Tx) power less than y on these time/frequency resources; Link Y must be able to be active with less than x dB interference; Scheduler for Link Y must be informed (and agree) before interference>x dB is allowed; for sequential interference cancellation (SIC) receivers interference must be either less than x or greater than y, wherein this restriction may be considered to be reflective of the modulation and coding scheme (MCS) used; beam pattern restrictions, for example the convolution for certain beam patterns must be less than y; and temporal SIC, for example if a link is scheduled that conflicts with another link, the impact of this conflict can be resolved by backhaul signalling. The above examples of restrictions and/or limitations may be provided to a scheduler in the set of constraints. It would be readily understood that other restrictions or limitations can be included in the set of constraints.

In some embodiments, a scheduler receives a localized request which can be indicative of a specific connection request which may include priority or urgency information related to this request. According to embodiments, the scheduler can evaluate this localized request and, if required, modify the initial schedule to accommodate the requested connection. By localizing the modification of the schedule of link activation, there can be a reduction of the amount of processing to be performed by the central controller, which may result in more efficient use of network resources, while accommodating localized requests. Furthermore, by localizing the modification of the schedule, time delays that would typically result from the transmission of these types of local requests or limitations to the central controller, and the subsequent transmission of the revised schedule from the central controller to the gateway or other device, can be mitigated.

According to embodiments of the present invention, a scheduler receives buffer status information for a collection of links. This information can be received from the network. For example, the buffer status information can be indicative of a potential buffer underflow or overflow event which may necessitate the modification of the initial schedule of link activation. A potential buffer underflow/overflow event can indicate that network resources associated with a link will not be used efficiently. An underflow event implies that unused or underused network resources at the link in question can be released without harming the overall network performance. An overflow event implies that transmission delays will occur over the link in question as a node associated with the link is incapable of transmitting the amount of data being received. An overflow event implies that resources at an upstream node can be released or repurposed without impacting network performance. In some embodiments, the scheduler further receives information indicative of flow splitting or other parameters that are indicative of localized flow information.

According to embodiments, a scheduler can further receive information indicative of operation of the links for which the scheduler is responsible. This information can relate to the directionality of a beam associated with a particular link. For example, for wireless communication that is operating in the high frequency range or ultra high frequency range, the propagation of waves is typically by line of sight and thus can be directly impacted by buildings and foliage. As such, beam steering which can provide a desired directional propagation of the waves may be required. Some types of local parameters, such as beam steering parameters, link drop out indicators, beam directionality parameters, frequency parameters and weather parameters, can be provided to or known by the scheduler and can be used to determine if modification of the initial schedule may be necessary due to the local environment. In addition, changes in the local environment may occur subsequent to the creation of the initial schedule by the central controller. For example, local weather conditions may change resulting in the swaying of a tree due to wind or changes in rainfall densities, both of which can impact wave propagation. In this instance, the scheduler can select appropriate links that can operate in the presence of communication limitations resulting from local environmental conditions and the scheduler can subsequently modify the initial schedule accordingly.

According to some embodiments, a scheduler is configured to transmit information to the central controller, the information providing the central controller with details relating to any modifications made to the initial schedule by the scheduler. In some embodiments, this information sent to the central controller can further include information relating to the reasons for the modifications, for example changes in local network functionality. This information relating to the reasons for modification may be used to update the central controller's data store relating to one or more characteristics of the communication network. This modification of the central controller's knowledge may be used for the evaluation and determination of subsequent initial schedules.

According to embodiments of the present invention, a scheduler is configured to interactively communicate with other schedulers in order to negotiate the modifications to the initial schedule. This negotiation can be performed in a manner such that each scheduler is satisfied with the particular modifications, for example the modifications fall within particular thresholds for each scheduler. In some embodiments, the negotiation can be more one sided, for example the requests of a first scheduler may have priority over the requests for a second scheduler. In some embodiments, the priority may be link dependent. For example, if two conflicting links are requested, the link that has the higher priority can be scheduled first.

In some embodiments, the interaction between a first scheduler and a second scheduler during a negotiation is primarily a one way negotiation. For example, a scheduler with a higher priority or seniority can inform another scheduler in the negotiation of the modification that is to be made, rather than a back and forth process fix determining an appropriate modification of the initial schedule.

In some embodiments of the present invention, when negotiation between schedulers is for a released resource, a bidding process may be performed between multiple schedulers. The bidding process can include multiple rounds of bids from each of the schedulers involved in the negotiation. A scheduler with the "highest" bid is assigned the resource, however the negotiating schedulers must agree upon the new assignment of the resource.

In some embodiments, the bidding process continues until a predefined time before the resource becomes available. In this instance, the highest bid at the predefined time is assigned the resource. The assignment of the network resource by a predetermined time before the resource is available can mitigate the potential waste of the resource.

In some embodiments, the negotiation by the schedulers is performed in order to mitigate the waste of system resources. For example, if a scheduler determines that a particular network resource will not be efficiently used, for example either partially or wholly unused, the scheduler notifies other schedulers that the resource will released and a negotiation between schedulers will commence in order to assign the released resource for another purpose. For example, when a scheduler receives notification of a buffer overflow/underflow event, this notification signifies that resources locally or upstream will not be efficiently used. A buffer underflow event can result in resources at the local link to being released whereas and a buffer overflow event can result in resources upstream from the local link being released.

According to embodiments of the present invention, a scheduler is configured to control a plurality of links. However, a scheduler controls a portion of the links from a particular node. For example, a particular scheduler may only control a first subset of the links associated with a particular node while a second scheduler controls the remaining links associated with that particular node.

According to embodiments, a scheduler can determine one or more parameters for activation of each of the links for which it is responsible. For example, these parameters can relate to generating signalling messages, selecting a modulation and coding scheme (MCS), maintaining buffers, or determining power allocations. Other link activation parameters may also be included as would be readily understood.

According to embodiments, a node is the actual device that transmits and receives information over an activated link. A node is communicatively coupled to another node upon activation of the particular link connecting them by the scheduler in charge of that link. A node can further calculate or determine any remaining information that has not been provided by the scheduler associated therewith for the operation of the link. For example, additional information can include MCS information if necessary, beam tracking information or other information as would be readily understood. A node can further prioritize the packets that will be sent over the link.

While the above has been described showing a two tier or two layer system which includes a central controller and one or more schedulers, in some embodiments the system includes three or more tiers or layers. For example, a global central controller can generate an initial schedule for link operation, which is subsequently provided to a secondary controller which is responsible for a predetermined region of the communication network. The secondary controller can modify this initial schedule based on one or more regional parameters, namely parameters indicative of operation of the predetermined region of the communication network, for subsequent provision of this modified initial schedule to the one or more schedulers. As such, each tier or layer provides the necessary control mechanisms and parameters to the subtier or sublayer directly underneath, in order to provide collaborative control of communication between nodes in a multiple access network through a shared communication medium. The above-described negotiation between schedulers can occur between schedulers on the same tier or layer. It is also noted that the view that a particular tier or layer has of the network may not be the same view as that of a lower layer or tier. For example, the abstraction provided by upper tiers or layers may be simplified compared to the abstraction provided to the lower tiers or layers. Information at lower tiers may not be fully provided to upper tiers and vice-versa.

In some embodiments one or more of the central controller, schedulers and nodes can be configured with sufficient functionality to enable instantiation of their respective functionality on an as-needed basis according to current processing requirements. These may, for example, be realized as Virtual Network Functions (VNFs) within a Network Function Virtualization (NFV) framework. For example, a VNF corresponds to a function enabling operation of a communication network. For example a VNF can provide the functions of a router, switch, gateway, firewall, load balancer, server, mobility management entities, and the like. The function is virtualized in the sense that it may utilize a set of virtual resources, such as computing, storage and networking resources, rather than utilizing dedicated hardware resources. As such, VNFs may be instantiated on an as-needed basis using available virtual resources. NFV and virtual network functions architecture is described in ETSI GS NFV-SWA 001, for example.

Moreover, it will be readily understood that while a central controller, schedulers and nodes are functionally separate entities, the functionality of each component may be instantiated on the same physical device. As such, when a step of transmitting instructions to activate the one or more links is performed, the scheduler may be transmitting these instructions to an access point that functionally resides on the same physical device.

In some embodiments, the central controller and/or schedulers may comprise software defined networking (SDN) components, or programs deployed on the same or differing device platforms of a communications network. SDN is an architectural framework for creating intelligent programmable networks, where the control planes and the data planes are decoupled, network intelligence and state are logically centralized, and the underlying network infrastructure is abstracted from the application. In embodiments of the present invention, the control plane may use customer information and provide information to form a network logical topology, for example as created via Software Defined Topology (SDT). The SDT can be combined with the SDN and Software Defined Protocol (SDP) to create a customized Virtual Network (VN). A VN is a collection of resources virtualized for a particular service. Customers include users of services via a UE, terminal, or other customer device. Providers include service providers, VN operators, and other providers of services over the wireless network.

As a separate matter, SDN allows for the management of network services through abstraction of lower-level functionality. Control functions may be separated from forwarding functions for example by controlling the forwarding nodes from a control element. NFV can facilitate the virtualization of entire classes of network node functions. VNFs can comprise or operate on one or more virtual machines running on relatively generic servers or computing equipment, such as commercial off-the-shelf hardware capable of being configured to provide a variety of functionalities, as opposed to dedicated hardware for a given functionality.

In some embodiments of the present invention, a scheduler can be configured to reside or be instantiated within a transmitting device, for example a UE, relay node, router node or the like.

In some embodiments, access nodes may comprise, for example, receivers, antennas, base transceiver stations (BTS), Node-B, evolved Node-B (eNodeB), a home Node-B, a home eNodeB, site controllers, access points (AP), and wireless routers. Access terminals may comprise any device configured for communications with access nodes for example, a cellular phone, a smart phone, a tablet, a wireless transmit/receive unit, a laptop, a personal digital assistant (PDA), a consumer electronics device, a data collection/transmission unit, a gaming unit, a set top box, or the like.

Links which communicatively couple access terminals to base stations access nodes may comprise one or more suitable wireless communication interfaces, for example radio frequency (RF), microwave, or infrared (IR). Any suitable Radio Access Technology (RAT) or channel access scheme may be implemented, such as CDMA, TDMA, FDMA, OFDMA, SC-FDMA, wideband CDMA (WCDMA) high-speed packet access (HSPA), evolved HSPA (HSPA-+), high-speed downlink packet access (HSDPA), high-speed uplink packet access (HSUPA), long term evolution (LTE), LTE advanced (LTE-A), universal mobile telecommunications system (UMTS), terrestrial radio access (UTRA), evolved UMTS terrestrial radio access (E-UTRA), IEE 802.16 (i.e., worldwide interoperability for microwave access (WiMAX)), CDMA2000, CDMA2000 IX, CDMA2000 EV-DO, interim standard 2000 (IS-2000), interim standard 95 (IS-95), interim standard 856 (IS-856), global system for mobile communications (GSM), enhanced data rates for GSM evolution (EDGE), GSM EDGE (GERAN), and the like.

Figure 3:
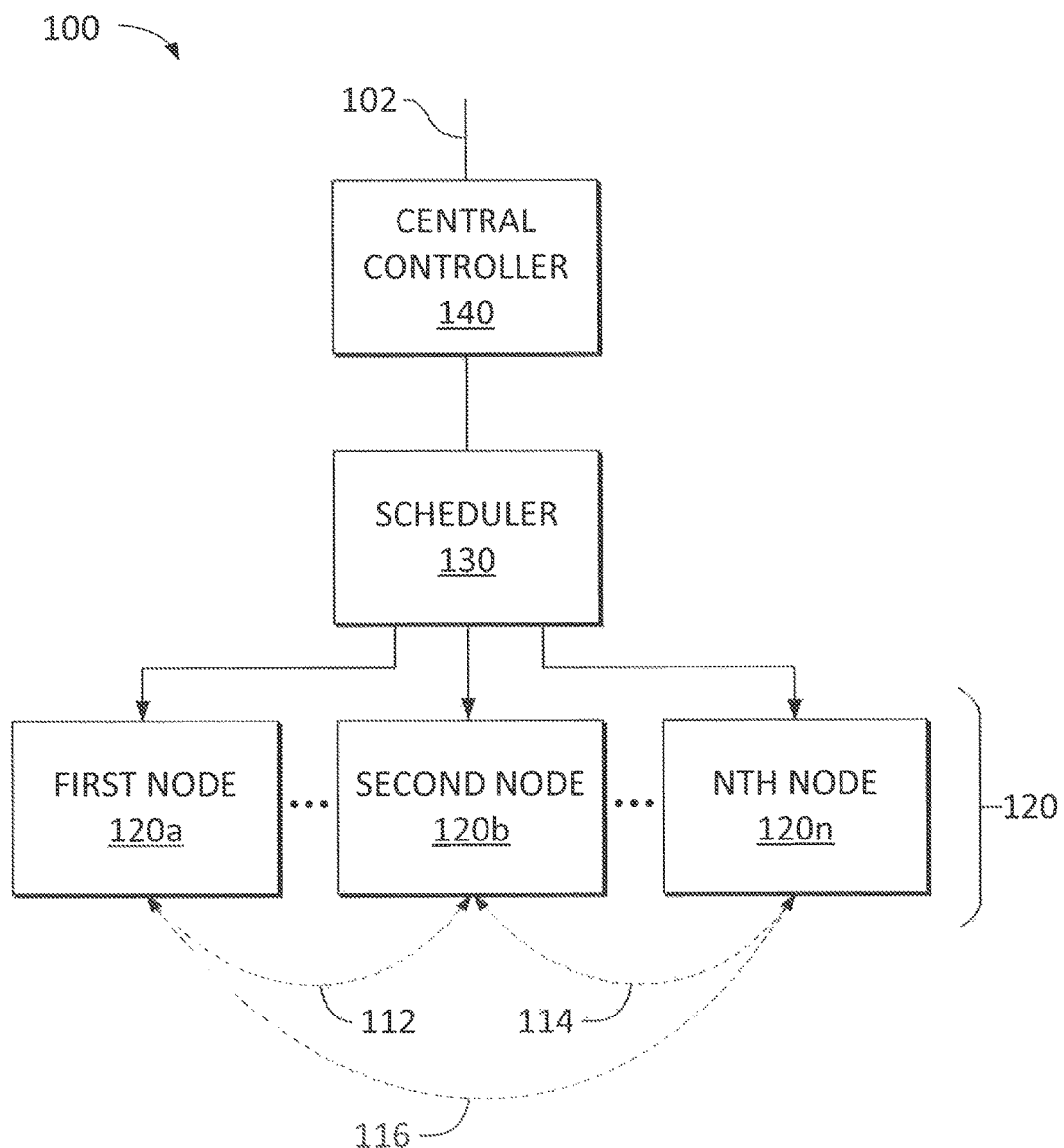
FIG. 3 illustrates a link scheduling system including a single scheduler according to an embodiment of the present invention.

Referring to FIG. 3, there is shown a link scheduling system 100 having a single scheduler 130, according to an embodiment of the present invention. The link scheduling system 100 further includes a central controller 140 in communication with the scheduler 130, which in turn is in communication with a plurality of nodes 120a-120n, collectively 120. Each node 120 may be configured to communicate with other nodes 120 via links therebetween, for example links 112, 114, 116. Central controller 100 may also communicate with additional network components through network link 102.

Figure 4:
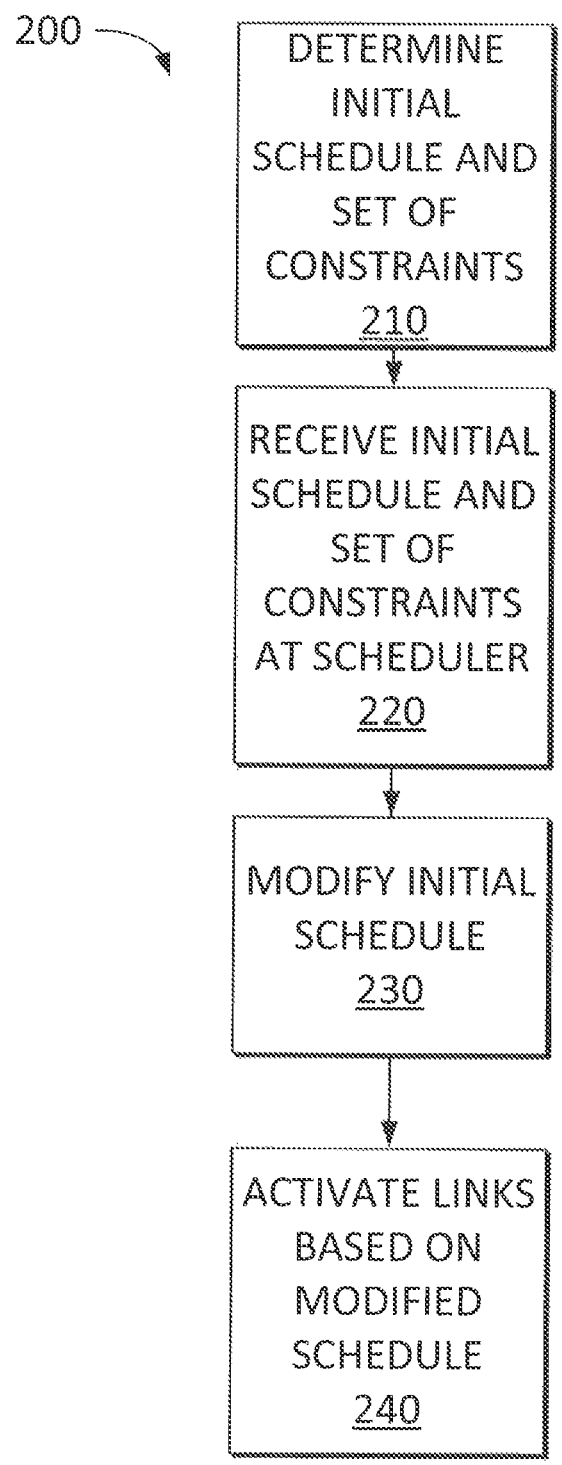
FIG. 4 illustrates a flow chart of a method for link scheduling, according to an embodiment of the present invention.

Referring to FIG. 4, there is shown a flow chart 200 illustrating a method for link scheduling, according to an embodiment, which may be applied to the link scheduling system of FIG. 3. At step 210, the central controller determines an initial schedule according to at least a global parameter. The central controller further determines a set of constraints. The initial schedule may comprise parameters defining initial management of one or more of links. At step 220, the scheduler receives the initial schedule or information indicative of the initial schedule and the set of constraints from the central controller. At step 230, the scheduler modifies the initial schedule based on a local parameter and the set of constraints to generate a modified schedule. The modified schedule contains parameters defining modified management of the links. At step 240, the scheduler links at least two of nodes according to the modified schedule.

Figure 5:
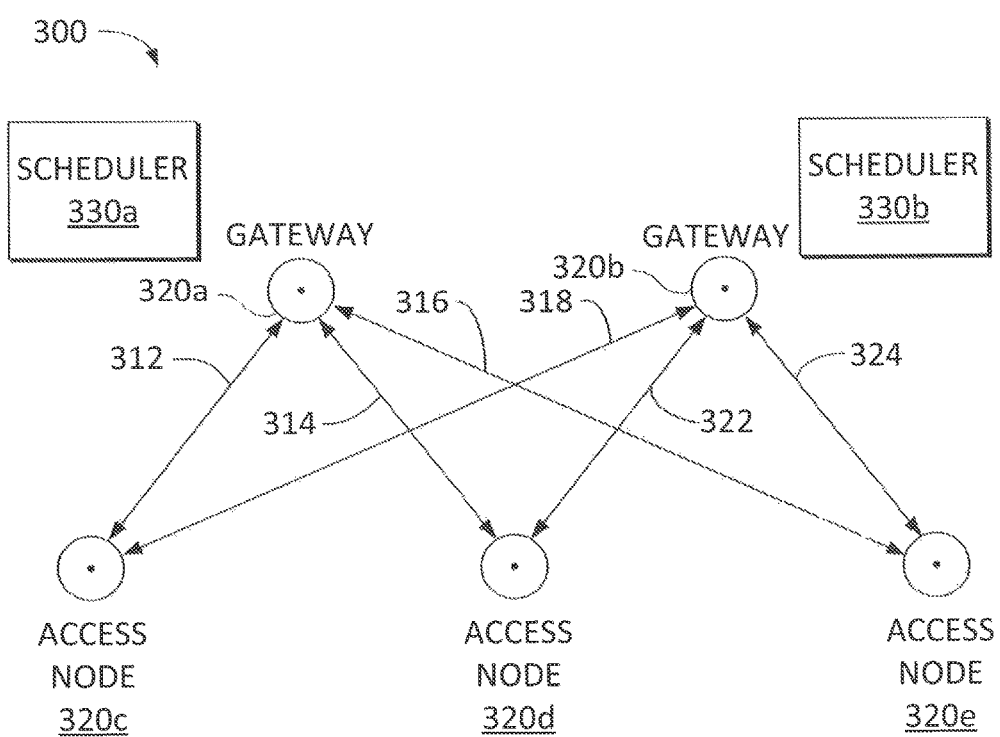
FIG. 5 illustrates a link scheduling system including plural schedulers according to an embodiment of the present invention.

Referring to FIG. 5, there is shown a link scheduling system 300, according to an embodiment of the present invention. The link scheduling system 300 includes gateways 320a, 320b, access nodes 320c, 320d, 320e and, schedulers 330a, 330b. Scheduler 330a is responsible for controlling links 312, 314, 316 associated with gateway 320a, while scheduler 330b is responsible for controlling links 318, 322, 324 associated with gateway 320b. In other embodiments, a single scheduler controls all links associated with both gateways. In some embodiments, multiple schedulers are used for the control of links at one of the gateway. In this instance, a first scheduler is responsible for controlling a first subset of the links associated with a gateway and a second controller is responsible for the rest of the links associated with the same gateway. Further, schedulers 330a, 330b are configured to communicate either directly or indirectly, thereby permitting interactive negotiation as will be discussed below.

Figure 6:
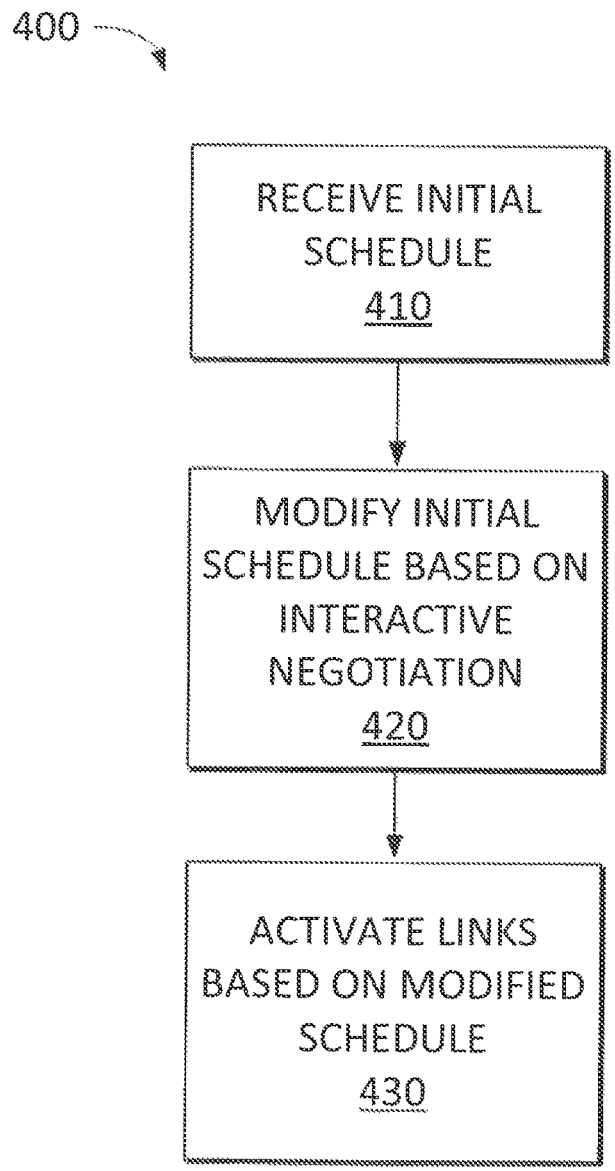
FIG. 6 illustrates a flow chart of a method for link scheduling, according to an embodiment of the present invention.

Referring to FIG. 6, there is shown a method 400 for link scheduling, according to an embodiment, which may be applied to the link scheduling system 300 of FIG. 5. At step 410, scheduler 330a receives an initial schedule or information indicative of the initial schedule, for example from a central controller or other network component. The initial schedule can include parameters defining initial management of one or more of links 312, 314, 316, 318, 322, 324. At step 420, the scheduler 330a modifies the initial schedule through interactive negotiation with scheduler 330b to generate a modified schedule. For example, scheduler 330b may receive a local scheduling request from access node 320e to activate link 324, which in turn is communicated to scheduler 330a. The local scheduling request may be used in negotiations or bidding to modify the initial schedule (discussed in greater detail below). Accordingly, the modified schedule may comprise parameters defining modified management of one or more of links 312, 314, 316, 318, 322, 324. At step 430, schedulers 330a, 330b link at least some of access nodes 320c, 320d, 320e, to gateways 320a, 320b according the modified schedule.

In some embodiments and with further reference to FIG. 6, after the modification of the schedule at step 420, the scheduler can subsequently send this modified schedule to a lower tier or lower layer scheduler, where steps 410 and 420 would be repeated at this lower tier or lower layer scheduler. Upon the second modification of the schedule, step 430 would be performed.

In embodiments of the link scheduling system which include multiple schedulers, interactive negotiation may be performed between the schedulers in order to arrive at a modified schedule that resolves issues such as: urgent requests, local parameters, or short term link activations involving other schedulers. Alternatively, interactive negotiation may be used to assign released network resources. For example, network resources that will not be efficiently used can be released for use by other schedulers.

Figure 7:
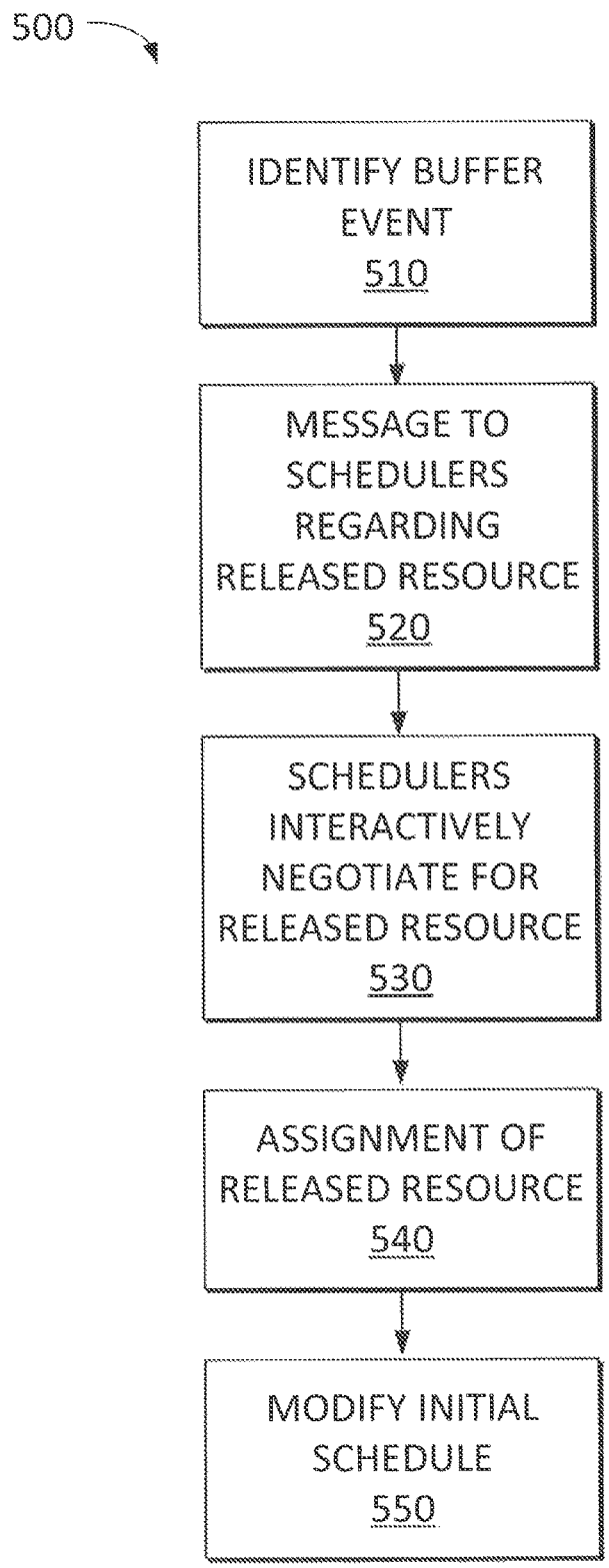
FIG. 7 illustrates a flow chart showing interactive negotiation between schedulers according to embodiments of the present invention.

Referring to FIG. 7, there is shown a flow chart highlighting an embodiment of interactive negotiation 500 between schedulers 330a, 330b, which may be additionally applied to the link scheduling system 300 of FIG. 5. At step 510, a buffer overflow or underflow event is identified by one of the nodes 320 or schedulers 330a, 330b. The identification of a buffer overflow/underflow event indicates that a network resource will not be efficiently used, and therefore in order to ensure efficient use of this network resource, the network resource can be released. At step 520, a message is sent to other schedulers indicating that a resource will become available. At step 530, schedulers 330a, 330b interactively negotiate for the released resource. This negotiation may include a series of messages sent between schedulers 330a, 330b to determine a suitable link for which the resource can be used. At step 540, the released resource is assigned to the suitable link determined through negotiation. At step 550, the initial schedule is modified to include the suitable link using the released resource.

Referring to FIGS. 8 and 9, there is illustrated an example of interactive negotiation between schedulers 330a, 330b, which includes bidding and bid resolution. In this example, the schedulers receive an initial schedule and set of constraints from the central controller. In this example, links 312, 314, 316, 318, 322, 324 are half-duplex, and accordingly, can only transmit in one direction at a given time. Further, each of the schedulers is provided with a set of constraints by the central controller that define restrictions to the links that that can be scheduled.

FIG. 8(a) illustrates an initial schedule 800 which schedulers 330a, 330b may receive, for example from a central controller (not shown). The initial schedule 800 comprises a chart of link activation sequences between gateways 320a, 320b, and access nodes 320c, 320d, 320e, grouped into resource blocks (slots). Resource blocks may comprise, for example, time/frequency intervals. The hatched blocks represent resources in which the link is expected to be active. Referring to FIG. 8(b), there is shown a set of constraints 830a for scheduler 330a, while FIG. 8(c) shows a set of constraints 830b for scheduler 330b. Each cross hatched block in FIGS. 8(b), 8(c) represents a link that scheduler 300a or 300b cannot schedule, due to the scheduler restrictions given to these schedulers by the central controller. Given that links 312, 314, 316, 318, 322, 324 are half-duplex, restrictions 830a, 830b may be determined by schedulers 330a, 330a to prevent schedule 800 from being updated with conflicting links. For example, a link is scheduled from gateway 320a to access node 320c (320a→320c) in slot one, as shown in schedule 800. Accordingly, restrictions 830a should prevent the reverse link from access node 320c to gateway 320a (320c→320a) from being scheduled in slot one, in view of the half duplex limitation of the links. Other factors, such as potential interference, path losses, and the like may also be considered when establishing restrictions 830a, 830b. Accordingly, restrictions 830a, 830b may operate as masks for time-domain duplex (TDD) scheduling, which prevent links from being scheduled that would interfere, degrade, or conflict with existing scheduled links.

Figures 9A, 9B:
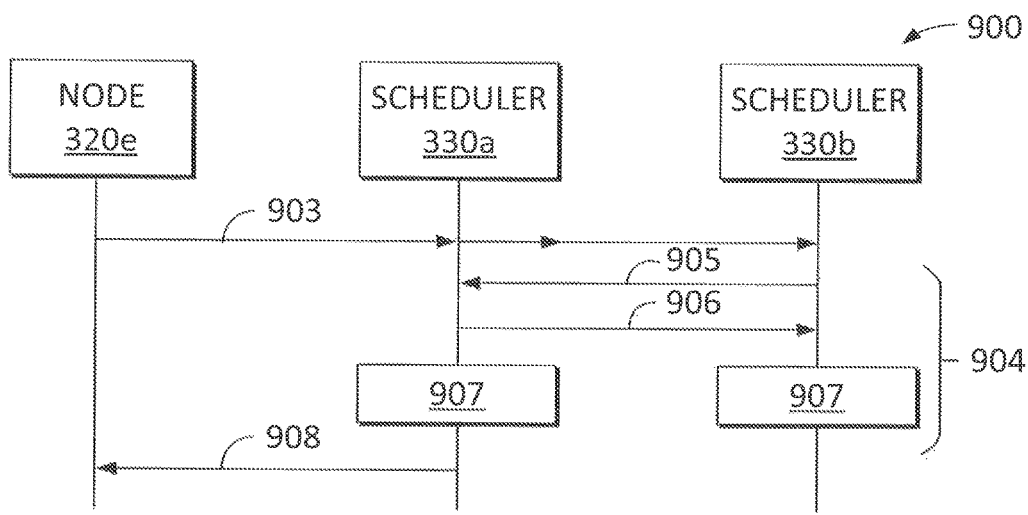
FIG. 9A illustrates a flow diagram showing interaction of a link scheduling system during interactive negotiation according to embodiments of the present invention.
FIG. 9B illustrates a modified schedule determined by interactive negotiation according to embodiments of the present invention.

Referring to FIG. 9(a), there is shown a flow diagram 900 illustrating communication with link scheduling system 300, according to an embodiment. Access node 320e identifies a buffer event (for example, a buffer overflow or underflow event) for the link from access node 320e to gateway 320b (320e→320b) at slot 4, and sends a message 903 to schedulers 330a, 330b indicating that the link will be released. In turn, schedulers 330a, 330b modify schedule 800 to remove the link from access node 320e to gateway 320b (320e→320b) at slot 4 831 in view of the message 903 resulting in the link being cleared 832 (FIG. 9(b)). Correspondingly, scheduler 330b removes the restriction on the link from gateway 320b to access node 320e (320b→320e) at slot 4, since this restriction no longer applies. Schedulers 330a, 330b, may then determine whether there are any link requests that require scheduling. These link requests may, for example, arise from a request from a local node or other local parameter. If both schedulers 330a, 330b require the released resource, scheduler 330b would send a first bid 905 to scheduler 330a, while scheduler 330a would send a second bid 906 to scheduler 330b. The first and second bids 905, 906 may comprise weights assigned by schedulers 330a, 330b and associated with respective link requests. As both schedulers 330a, 330b are now informed of the first and second bids 905, 906, bid resolution 907 results in the link being awarded to the scheduler having the highest bid (or weight). The initial schedule 800 can be modified to include the link request associated with the highest bid and upon activation of the requested link, a modified grant will be received by access node to which the link has been assigned. For example, the modified grant 908 will be transmitted from scheduler 330a to access node 320e as illustrated in FIG. 9(a).

Figure 10:
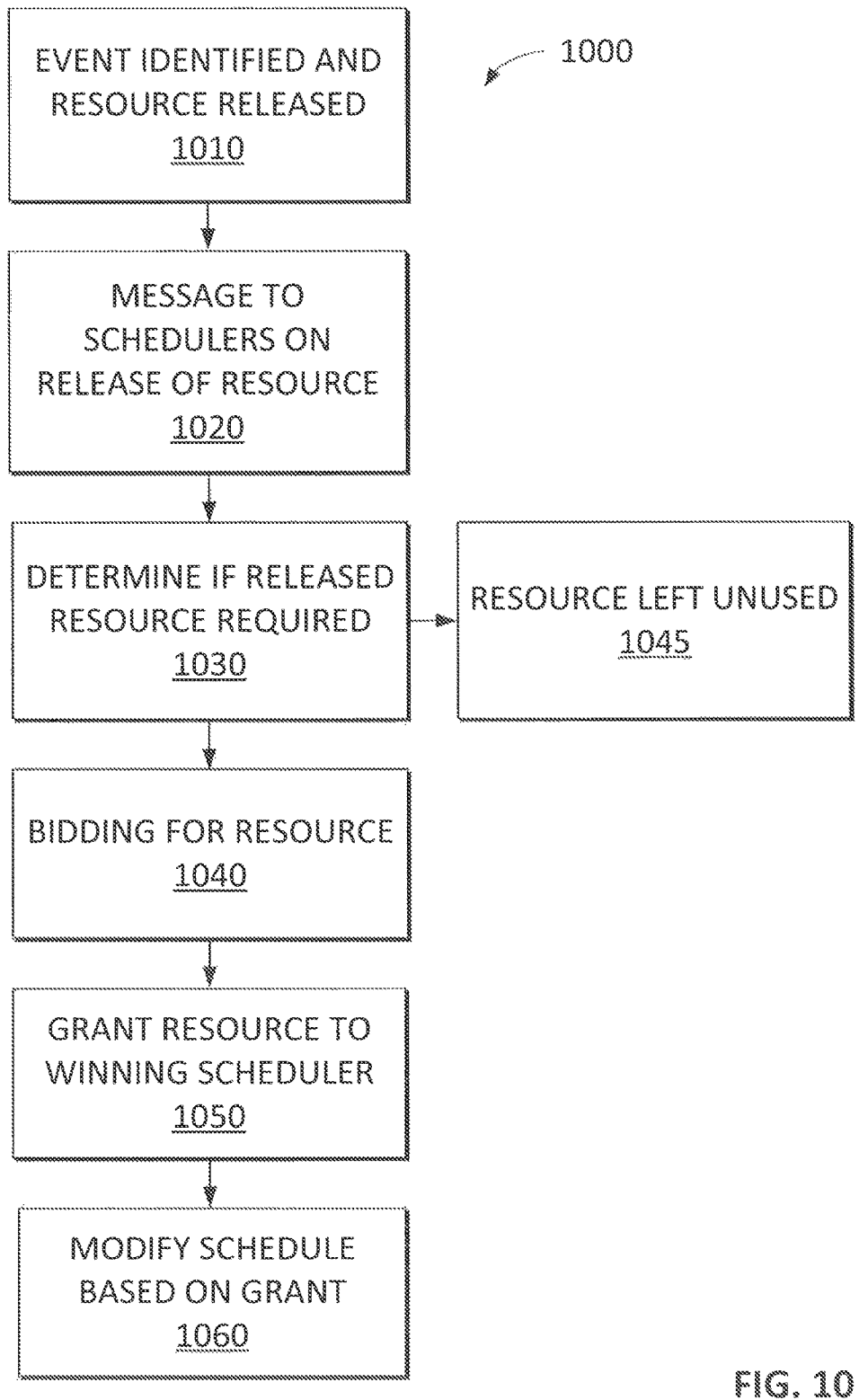
FIG. 10 illustrates a flow chart showing interactive negotiation between multiple schedulers according to embodiments of the present invention.

Referring to FIG. 10, there is shown an interactive negotiation 1000 between schedulers. This negotiation further includes bidding and bid resolution as can be applied to released resources. At step 1010, an event is identified that implies the impending release of a resource. The event can be a buffer overflow/underflow event. At step 1020, a message indicating the release of a resource is received by schedulers that would be capable of using the released resource. At step 1030, each of the schedulers determines if it has a pending request for a link to be scheduled, to which the released resource can be applied. If none of the schedulers require the released resource, the resource remains unused 1045. If there are link requests, at step 1040, each of the schedulers sends a bid to the other schedulers which received the message indicating the release of the resource. In some embodiments, a scheduler can associate a weight or priority with the bid sent to the other schedulers. This weight or priority can be indicative of the urgency or importance of the link request which resulted in the bid from the scheduler. At step 1050, bid resolution is performed by granting the released resource to the scheduler which sent the highest bid. At step 1060, the schedule is modified to assign the released resource to the requested link associated with the highest bid.

Aspects or embodiments of the present invention may also be implemented by using hardware only, or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of statements and instructions that enable a computer device to execute operations for configuring or programming a digital logic apparatus in accordance with embodiments of the present invention.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A system for managing links in a wireless communication network, the system comprising:
 a central controller configured to determine an initial schedule according to at least a global parameter, wherein the global parameter is indicative of one or more global aspects of the wireless communication network, the one or more global aspects being reflective of global network demand of the wireless communication network, the initial schedule defining initial management of the links, each of the links permitting data transmission between a pair of nodes when activated;
 a first scheduler configured to control a first subset of the links, the first scheduler further configured to receive information indicative of the initial schedule from the central controller, the initial schedule defining initial management of the links;
 a second scheduler configured to control a second subset of the links; and
 the first scheduler configured to modify the initial schedule based on interactive negotiation with the second scheduler, thereby generating a modified schedule defining modified management of the links, the first scheduler further configured to transmit instructions to activate the first subset of links according to the modified schedule and the second scheduler configured to transmit instructions to activate the second subset of links according to the modified schedule;

the first scheduler further configured to receive a set of constraints, wherein the set of constraints limit modifications that can be made to the initial schedule.

2. The system of claim 1, further comprising a secondary controller associated with a predetermined region of the wireless communication network, the secondary controller configured to receive a first schedule and modify the first schedule based on a regional parameter, thereby generating the initial schedule for provision to the first scheduler.

3. The system according to claim 1, wherein the first scheduler and the second scheduler are configured to interactively bid on one or more resources to be released.

4. The system according to claim 3, wherein the one or more resources is to be released if a buffer underflow event or buffer overflow event is identified.

5. The system of claim 1, wherein one or more of the central controller, the first scheduler and the second scheduler are configured as virtual network functions.

6. A method for managing links in a wireless communication network, the method comprising:

determining, by a central controller, an initial schedule according to at least a global parameter, wherein the global parameter is indicative of one or more global aspects of the wireless communication network, the one or more global aspects being reflective of global network demand of the wireless communication network, the initial schedule defining initial management of the links, each of the links permitting data transmission between a pair of nodes when activated;

receiving, by a first scheduler, information indicative of the initial schedule from the central controller, the initial schedule defining initial management of the links, wherein the first scheduler controls a first subset of the links;

receiving, by the first scheduler, a set of constraints, wherein the set of constraints limit modifications that can be made to the initial schedule;

modifying, by the first scheduler, the initial schedule based on interactive negotiation with a second scheduler, thereby generating a modified schedule defining modified management of the links;

transmitting, by the first scheduler, instructions to activate the first subset of links according to the modified schedule; and transmitting, by the second scheduler, instructions to activate a second subset of the links according to the modified schedule, wherein the second controller controls the second subset of links.

7. The method of claim 6, further comprising receiving, by a secondary controller, a first schedule and modifying, by the secondary controller, the first schedule based on a regional parameter, thereby generating the initial schedule for provision to the first scheduler, wherein the secondary controller is associated with a predetermined region of the wireless communication network.

8. The method according to claim 6, further comprising interactively bidding, by the first scheduler and the second scheduler, on one or more resources to be released.

9. The method according to claim 8, wherein the one or more resources is to be released if a buffer underflow event or buffer overflow event is identified.

* * * * *

UNITED STATES PATENT AND TRADEMARK OFFICE
CERTIFICATE OF CORRECTION

| | | |
|---|---|---|
| PATENT NO. | : 10,425,956 B2 | Page 1 of 1 |
| APPLICATION NO. | : 14/828872 | |
| DATED | : September 24, 2019 | |
| INVENTOR(S) | : Aaron Callard et al. | |

It is certified that error appears in the above-identified patent and that said Letters Patent is hereby corrected as shown below:

In the Specification

In the description

Column 2, Line 18:
"initial management of one or more links. The method thither"
Should read:
--initial management of one or more links. The method further--

Column 5, Line 20:
"such that a link for use by access 18 can be provided."
Should read:
--such that a link for use by access node 18 can be provided.--

Column 5, Line 31:
"ule based on shaft term and localized requests to schedulers"
Should read:
--ule based on short term and localized requests to schedulers--

Column 7, Line 1:
"when the interference is below a certain. Also for a given"
Should read:
--when the interference is below a certain threshold. Also for a given--

Column 10, Line 25:
"made, rather than a back and forth process fix determining"
Should read:
--made, rather than a back and forth process for determining--

Signed and Sealed this
Thirty-first Day of March, 2020

Andrei Iancu
*Director of the United States Patent and Trademark Office*